(12) United States Patent
Vazeille et al.

(10) Patent No.: US 7,788,680 B2
(45) Date of Patent: Aug. 31, 2010

(54) METHOD AND SYSTEM FOR EVENT MANAGEMENT

(75) Inventors: Philippe Vazeille, La Chapelle Saint-Ursin (FR); Jean-Pierre Bourgoin, Bourges (FR)

(73) Assignee: MBDA France, Paris (FR)

( * ) Notice: Subject to any disclaimer, the term of this patent is extended or adjusted under 35 U.S.C. 154(b) by 1455 days.

(21) Appl. No.: 10/517,236

(22) PCT Filed: Jun. 12, 2003

(86) PCT No.: PCT/FR03/01761

§ 371 (c)(1),
(2), (4) Date: Dec. 8, 2004

(87) PCT Pub. No.: WO03/107185

PCT Pub. Date: Dec. 24, 2003

(65) Prior Publication Data

US 2005/0229181 A1    Oct. 13, 2005

(30) Foreign Application Priority Data

Jun. 12, 2002    (FR)    .................................. 02 07188

(51) Int. Cl.
*G06F 3/00* (2006.01)
*G06F 13/00* (2006.01)
*G04F 1/00* (2006.01)
(52) U.S. Cl. ................. 719/318; 702/176; 711/100
(58) Field of Classification Search ................ 719/318; 711/101, 100; 702/176
See application file for complete search history.

(56) References Cited

U.S. PATENT DOCUMENTS 4,538,235 A * 8/1985 Henning ..................... 702/176

(Continued)

FOREIGN PATENT DOCUMENTS

EP    0 537 098 A    4/1993

(Continued)

OTHER PUBLICATIONS

Krishna M. Kavi, Mutual Exclusion on Optical Buses, Feb. 2002.*

(Continued)

*Primary Examiner*—Lechi Truong
(74) *Attorney, Agent, or Firm*—Weingarten, Schurgin, Gagnebin & Lebovici LLP

(57) ABSTRACT

The invention relates to managing events in a standard computer system comprising a central unit connected to memory units and peripheral devices by a data bus (50) allowing a multimaster configuration, the method comprising the following steps:
 receiving events,
 time-stamping and storing the events,
 assigning at least one appropriate action to each received event, and
 executing that action in response to the received event,
which method is characterized in that the above-mentioned management steps are carried out in real time without access to the central unit via a management unit (70) included in an independent management module (60) connected to the data bus (50) and incorporated into the standard computer system.

24 Claims, 5 Drawing Sheets

U.S. PATENT DOCUMENTS

| | | |
|---|---|---|
| 5,010,482 A | 4/1991 | Keller et al. |
| 5,522,058 A * | 5/1996 | Iwasa et al. ................. 711/145 |
| 5,737,240 A | 4/1998 | Ellsworth et al. |
| 5,748,967 A * | 5/1998 | Nakamura et al. .......... 717/168 |
| 5,764,953 A * | 6/1998 | Collins et al. ................. 703/17 |
| 5,893,155 A * | 4/1999 | Cheriton ..................... 711/144 |
| 6,639,538 B1 * | 10/2003 | Sechi et al. ................. 341/155 |
| 2002/0152185 A1 * | 10/2002 | Satish Jamadagni ........... 706/1 |
| 2003/0005099 A1 * | 1/2003 | Sven et al. .................. 709/223 |
| 2003/0046324 A1 * | 3/2003 | Suzuki et al. ............... 709/100 |
| 2003/0197632 A1 * | 10/2003 | Rubin et al. ................ 341/141 |

FOREIGN PATENT DOCUMENTS

EP    0 942 367 A    9/1999

OTHER PUBLICATIONS

Halang et al., "High Accuracy Concurrent Event Processing in Hard Real-Time Systems," Real-Time Systems, 12, Kluwer Academic Publishers, Boston, 1997, p. 77-94.

* cited by examiner

METHOD AND SYSTEM FOR EVENT MANAGEMENT

This application is a 371 national phase filing of PCT/FR03/01761 filed Jun. 12, 2003, and claims priority to a French application No. 02/07188 filed Jun. 12, 2002.

BACKGROUND OF THE INVENTION

The present invention relates to the management of events in a standard computer system comprising a central unit connected to memory units and peripheral devices by a data bus providing for a multimaster configuration.

Controlling certain processes necessitates detecting parameters and sending appropriate command instructions in real time or on an extremely short timescale of the order of one microsecond (µs). This type of application is encountered in the aerospace field and in the control of certain industrial processes.

There exist real-time control systems based on programmable logic controllers. The drawbacks of those logic controllers are their limited processing power and, more importantly, their incompatibility with standard computer networks, because the specific nature of systems based on logic controllers rules out connecting them to a standard computer network.

Moreover, real-time control of the various units of a computer system is not possible in the case of a standard computer system, for example one based on a microcomputer, provided with high-speed data buses or communications channels (for example a PCI bus) and controlled by a multitasking operating system (for example Windows NT).

FIG. 13 is a very diagrammatic representation of a standard computer system comprising a central unit 10 controlled by a 10 MHz clock (not shown), for example, a memory unit 20 and peripheral devices 30, 40 and a software environment (operating system) necessary for processing information. The central unit 10 provides the control function and carries out arithmetic and logic operations. The memory unit 20 comprises random-access memory 21 and read-only memory 23, and the peripheral devices comprise input and output interfaces. Data, addresses, and control and synchronization signals are exchanged between the various units of the computer system via a data bus 50.

In the above kind of standard computer system, provided with a "real-time" operating system, there is no provision for fast and accurate processing of incoming discrete signals or data on the data bus 50. That kind of operating system provides only for dialogue between the central unit and one other unit, with response times of the order of one millisecond (ms), which are unsuited to processes comprising important and highly sensitive parameters, as encountered in the aerospace field.

OBJECT AND SUMMARY OF THE INVENTION

An object of the invention is to remedy the above drawbacks and to this end to propose a method of managing events in a standard computer system comprising a central unit connected to memory units and peripheral devices by a data bus allowing a multimaster configuration.

The method comprises the following steps:
receiving events,
time-stamping and storing the events,
assigning at least one appropriate action to each received event, and
executing that action in response to the received event, such that the above-mentioned management steps are carried out in real time without access to the central unit by a management unit included in an independent management module connected to the data bus and incorporated into the standard computer system.

Thus a standard computer system is converted into a real-time system by installing a single additional management module.

Each event received is stored in a first memory associated with the management unit and the real-time management timescale is of the order of one microsecond.

The independent management module is preferably isolated from the central unit by a bridge.

The action to be executed is read in a table of actions associated with the management unit and is pre-programmed via the data bus.

The events received by the management unit are advantageously time-stamped with an accuracy of the order of 100 nanoseconds and stored in a second memory associated with the management unit so that these events may be read via the data bus in order to log and control them.

The events received by the management unit may be generated by a clock register internal to the management module, by a unit adjacent the management module or by equipment external to the computer system.

Events received by the management unit are synchronized to a frequency corresponding to that of a clock internal to the computer system.

In one particular embodiment of the invention, events received from external equipment are filtered to eliminate interference.

An interrupt is advantageously generated by the management unit if an event may not be associated with an action.

Another object of the invention is to provide an event management module incorporated into a standard computer system comprising a central unit connected to memory units and peripheral devices by a data bus allowing a multimaster configuration, which module is characterized in that it comprises:

an independent management unit connected to the central unit via an interface and the data bus, said management unit being adapted to receive and process events in real time without intervention by the central unit, a time-stamping clock adapted to time-stamp these events before storing them in a first memory internal to the management unit, and a random-access memory containing a preprogrammed table of actions, associated with the management unit and adapted to assign appropriate actions to events received thereby.

The data bus is a standard bus selected from the group comprising a PCI bus, a VME bus, a compact PCI bus and a USB bus.

According to one feature of the invention, the management module further comprises a second memory internal to the management unit for storing events in order to read them via the data bus.

The first and second memories are advantageously of the FIFO type and the random-access memory containing the table of actions is advantageously a double-port RAM.

BRIEF DESCRIPTION OF THE DRAWINGS

Other features and advantages of the method and the system according to the invention will emerge from the following description, which is given by way of illustrative and non-limiting example and with reference to the appended drawings, in which.

DETAILED DESCRIPTION OF EMBODIMENTS OF THE INVENTION

Figure 1:
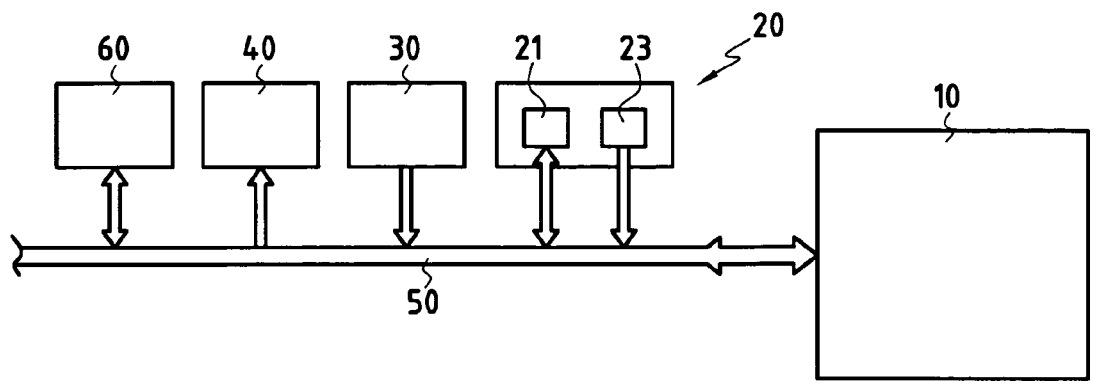
FIG. 1 is a very diagrammatic view of an event management module of the invention installed in a standard computer system.

FIG. 1 is a very diagrammatic representation of an event management module 60 of the invention incorporated into a standard computer system. The management module 60 is connected to the central unit 10 via a data bus 50 that allows a multimaster or multiprocessor configuration, thereby enabling the management module 60 to operate separately from and independently of the central unit 10. In this case, the data bus 50 is a standard PCI, VME, compact PCI or USB bus. Thus the incorporation of the management module 60 converts the standard computer system into a real-time computer system.

Figure 2:
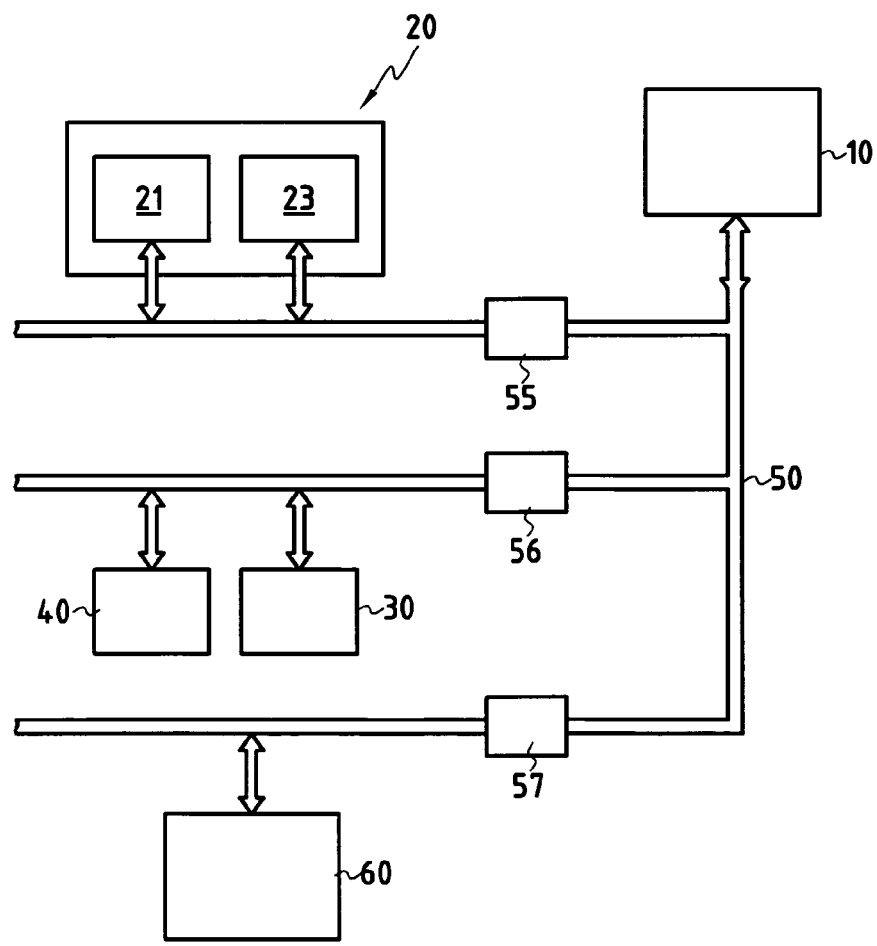
FIG. 2 is a very diagrammatic view of an event management module of the invention installed in a standard computer system with an architecture based on a PCI data bus.

FIG. 2 shows one example of an event management module 60 incorporated in a standard computer system with an architecture based on a PCI data bus 50. The PCI bus is a synchronous bus supporting multiplexing of data, addresses and signals and providing for a multimaster configuration. Furthermore, the specification of the PCI bus authorizes the interconnection and use of gateways or bridges. This figure shows that the memory units 20, peripheral devices 30, 40 and management module 60 are installed in cascade via respective bridges 55, 56, 57. The bridges serve as filters for the units that are not involved in the central unit dialogue. Thus the bridge 57 improves the isolation of the management unit 60 from the central unit 10 when the former is engaged in dialogue with other electronic units.

Figure 3:
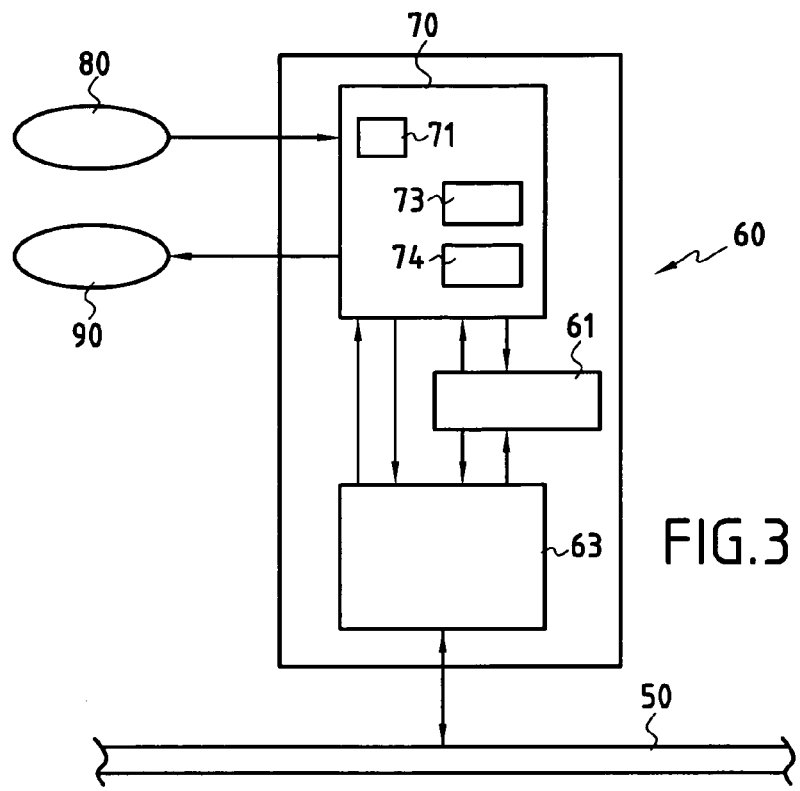
FIG. 3 is a more detailed diagram of the event management module shown in FIGS. 1 and 2.

FIG. 3 shows in more detail the event management module 60 shown in FIGS. 1 and 2. This module comprises a management unit 70 controlled by a synchronization clock at a frequency of 33 megahertz (MHz), for example. The management unit 70 receives events 80 and executes corresponding actions 90 in real time and without intervention by the central unit. At least one appropriate action is assigned to each received event. To this end, the management unit 70 is connected to a random-access memory 61, for example of the double-port RAM type, accessible in read mode and in write mode. Of course, the management unit 70 is connected to the data bus 50 via a standard interface 63 that facilitates the exchange of data with the data bus 50. Moreover, the management module 60 comprises a plurality of clock registers or internal counters, not shown in the figure, which may be incorporated into the management unit 70 or into the interface 63. For example, the management module 60 comprises sixteen 20-bit clock registers running on a timescale of one millisecond.

An event 80 is generally defined by a triggering signal that identifies each event and possibly by a vector or pointer indicating to the management unit 70 the address of the corresponding action or actions to be executed.

The management unit 70 further comprises a time-stamping clock 71 operating at a frequency of 10 MHz, for example, enabling an event 80 to be time-stamped to an accuracy of 100 nanoseconds.

The time-stamping clock 71 may comprise a 16-bit first register and a 32-bit second register. The first register provides an intermediate timebase on a timescale of one millisecond and uses it to clock the second register, with the result that an event 80 may be time-stamped to within $2^{32} \times 10^{-3} = 4.3 \times 10^6$ seconds.

Furthermore, the management unit 70 is associated with a first memory 73 and a second memory 74 for storing received events 80. The first memory 73 and the second memory 74 are preferably internal to the management unit 70.

For example, the first memory 73 is of the "first in first out" (FIFO) type comprising 256 words each of 16 bits for storing events remaining to be processed in chronological order.

The second memory 74 may comprise two FIFO memory areas accessible independently. A first memory area is for storing time-stamps in milliseconds and a second memory area is for storing events.

The first memory area (milliseconds) comprises 256 words each of 32 bits, for example, representing the arrival time-stamp in milliseconds of the event. The second memory area (events) comprises 256 words each of 32 bits, for example, wherein the eight more significant bits indicate the origin of the event, the next eight bits represent the number of the vector that produced the event, and the sixteen less significant bits represent time in hundreds of nanoseconds.

Figure 4:
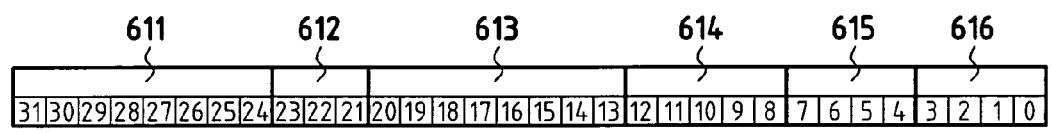
FIG. 4 shows the various portions of a word stored in a table of actions according to the invention.

According to the invention, the random-access memory 62 comprises a table of actions for storing words that define an action as a function of an event. FIG. 4 shows one example of the various portions of a 32-bit word 610 from the action table. The eight more significant bits correspond to an input vector 611 associated with the event, the next three bits represent the corresponding action 612, the next eight bits represent an output vector 613 associated with the action followed by a five-bit complement 614, the next four bits represent an output signal 615 and, finally, the four less significant bits represent a clock register number 616.

It will be noted that the table of actions is initialized or written via the data bus 50 before the processing of events is started, and may be read at any time via the same bus.

An event management method of the invention is described next with reference to FIGS. 5 to 8 in addition to FIG. 3.

Figure 5:
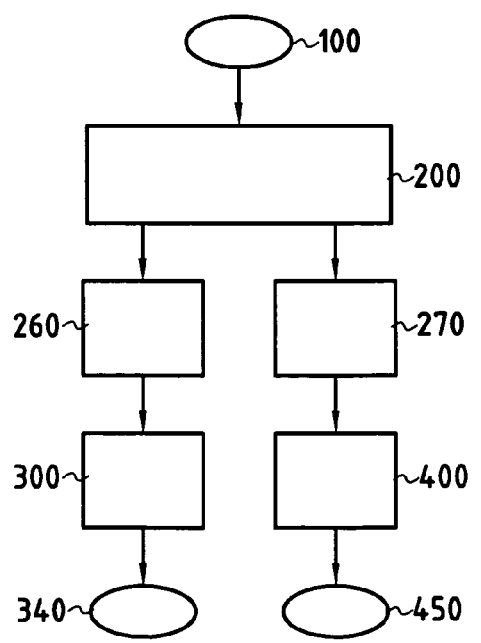
FIG. 5 is a flowchart showing the general execution of an event management method of the invention.

FIG. 5 is a flowchart showing the general execution of an event management process comprising event detection, processing and observation phases.

In the step 100, an event 80 is reported by a triggering signal that may come from outside the computer system or via the data bus 50 by writing of data coming from a unit adjacent the management unit 70 or from a clock register internal to the management module 60.

In the step 200, the event is detected by the management unit 70 and is time-stamped with an accuracy of the order of 100 nanoseconds by the time-stamping clock 71. The received event is stored in the first memory 73 (step 260) and also in the second memory 74 along with its arrival time-stamp (step 270).

In the step 300, the events stored in the first internal memory 73 are processed synchronously. Then, in the step 340, an action is executed after reading the table of actions in the random-access memory 61. The action may be addressed to a clock register, the data bus, a signal generator or an input-output interface.

As a general rule, the timescale of real-time event management is less than or equal to about one microsecond. For example, the occurrence, time-stamping and storing of an event correspond to two 10 MHz time-stamping clock cycles, i.e. 200 nanoseconds. Searching the double-port random-access memory 61 for the action corresponds to 10 cycles of the 33 MHz synchronization clock, i.e. 303 nanoseconds. Preparation of processing corresponds to two cycles of the 33 MHz synchronization clock, i.e. 60.6 nanoseconds. Execution of the action, in the case of a master mode PCI bus architecture, corresponds to five cycles of the 33 MHz synchronization clock, i.e. 151.5 nanoseconds. Accordingly, in this example, the overall response time is 715.1 nanoseconds, and therefore less than 1 microsecond.

In the step 400, the software environment of the standard computer system enables events stored in the second internal memory 74 to be observed via the data bus 50 in a manner that is known in the art (step 450). It is therefore possible to monitor and trace these events.

Figure 6:
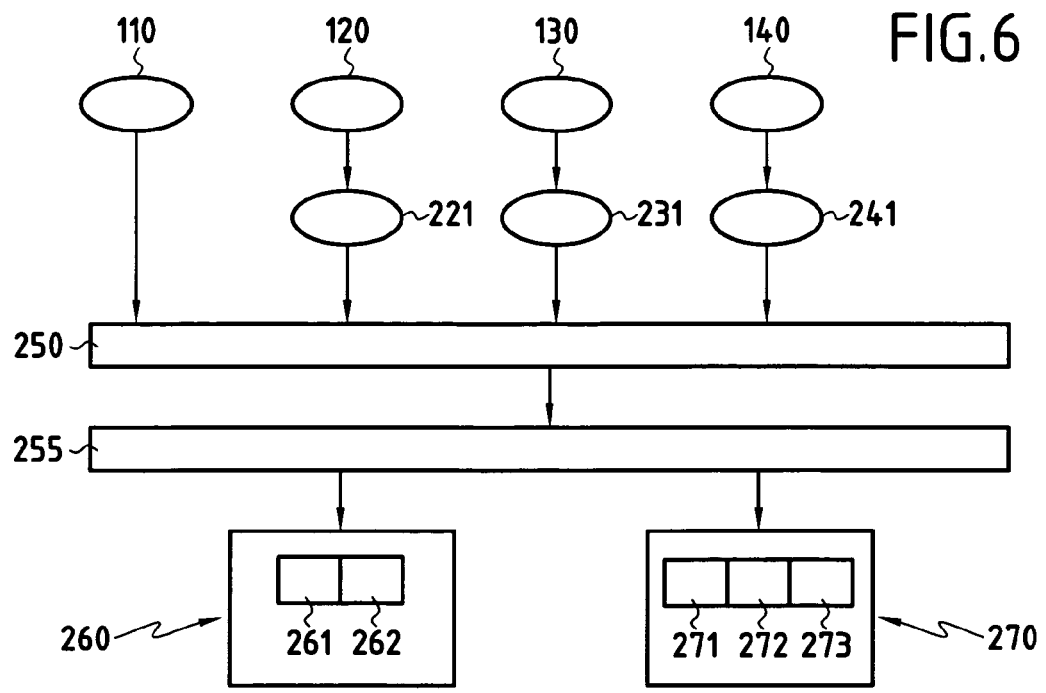
FIG. 6 is a flowchart showing a detection method conforming to the FIG. 5 flowchart.

FIG. 6 shows the event detection process in more detail. The received event may independently be an internal triggering signal (step 110), an external triggering signal (step 120), a triggering signal with an associated vector coming from the data bus (step 130) or an external triggering signal with an associated vector (step 140). It will be noted that any conflicts between different simultaneous events are eliminated, for example in a random manner.

The internal triggering signal (step 110) may come from a clock register internal to the management module 60 and which triggers signals at preprogrammed time intervals. These time intervals may be regular, in order to enable the management unit 70 to send a command to transmit data cyclically and deterministically. The management unit may decide to start or stop these clock registers. Moreover, the clock registers may operate automatically.

It will be noted that, because the signal coming from an internal clock register is already synchronized, the process advances directly to a step 250 after the signal is received.

Furthermore, the events received in the steps 120, 130 and 140 are resynchronized to the internal clock frequency of the computer system in the respective steps 221, 231 and 241 before the process proceeds to the step 250. The resynchronization frequency is of the order of 10 MHz, for example.

In the next step 250, each event received by the time-stamping clock 71 is assigned an arrival time-stamp accurate to 100 nanoseconds.

In the step 255, the events are identified by the management unit 70, and where applicable autovectored, meaning that vectors are reserved in order to be associated firstly with external signals comprising no vectors and secondly with signals coming from the internal clock registers. The events are then stored in the steps 260 and 270.

In the step 260, the event, which comprises data corresponding to the triggering or identification signal 261 and data corresponding to the associated vector 262, is stored in the first internal memory 73.

In the step 270, the event, which comprises data corresponding to the triggering or identification signal 271, data corresponding to the associated vector 272, and data corresponding to the arrival time-stamp 273, is stored in the second internal memory 74.

It will be noted that if the first memory 73 and/or the second memory 74 is filled, an interrupt is generated by the management unit 70 and sent to the central unit 10 via the data bus 50 in order to report the possible loss of one or more detected events. It should be noted that this interrupt is the only real-time link with the central unit.

Figure 7:
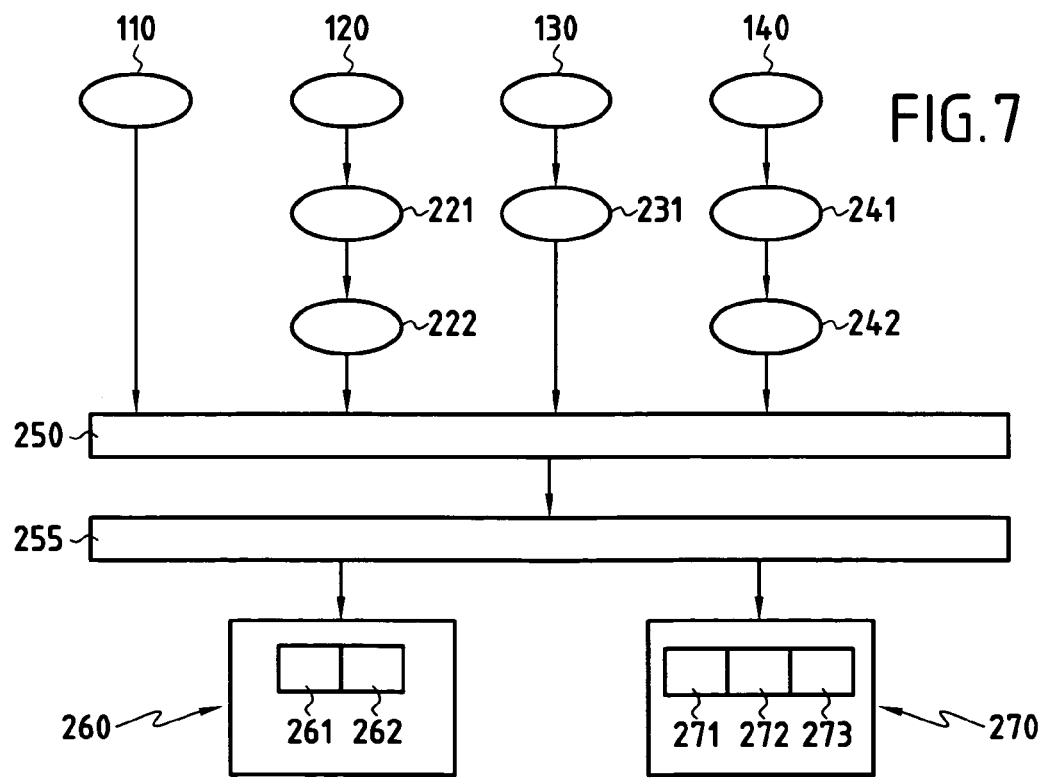
FIG. 7 is a variant of FIG. 6.

An alternative detection process is shown in FIG. 7 and differs from that shown in FIG. 6 in that after the resynchronization steps 221 and 241 the external events are filtered in the respective steps 222 and 242 before the process proceeds to the step 250. Accordingly, for improved security, external events are filtered by filters known in the art in order to eliminate interference coming from adjacent peripheral devices. On the other hand, filtering implies a loss of a few microseconds and thus an increase in the response time.

Figure 8:
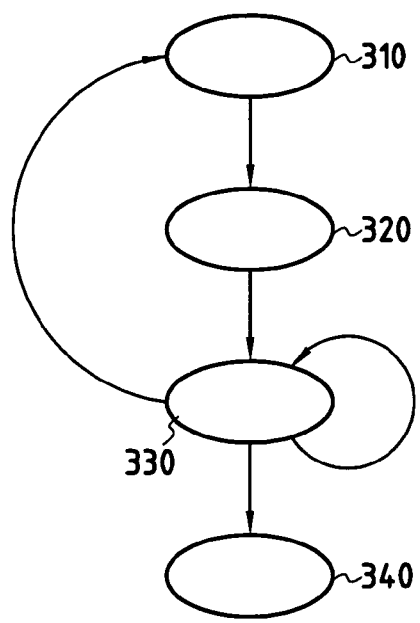
FIG. 8 is a flowchart showing an event processing process conforming to the FIG. 5 flowchart.

FIG. 8 shows event processing in more detail.

If one or more events are present in the first internal memory 73, processing is initiated in the step 310.

In the step 320, the vectors or autovectors associated with the events stored in the first internal memory 73 are read sequentially.

Then, in the step 330, the vector associated with the event received first is looked up in the table of actions. If the vector indicates that there are no further actions to be executed, the process returns to the starting step 310. If no vector is found in the table of actions, an interrupt is generated and the process also returns to the starting step 310. However, if the vector is found, the associated action or actions are executed in the step 340.

Accordingly, in normal operation, i.e. in the absence of an interrupt, the central unit is not involved in event detection and processing. Consequently, an action is executed in response to an event with a very short response time, of the order of one microsecond.

Moreover, the central unit initializes the clock registers or starts the management unit, for example. Once the initializations have been completed, the central unit is no longer involved in event management and may therefore be used for any other task.

Figure 9:
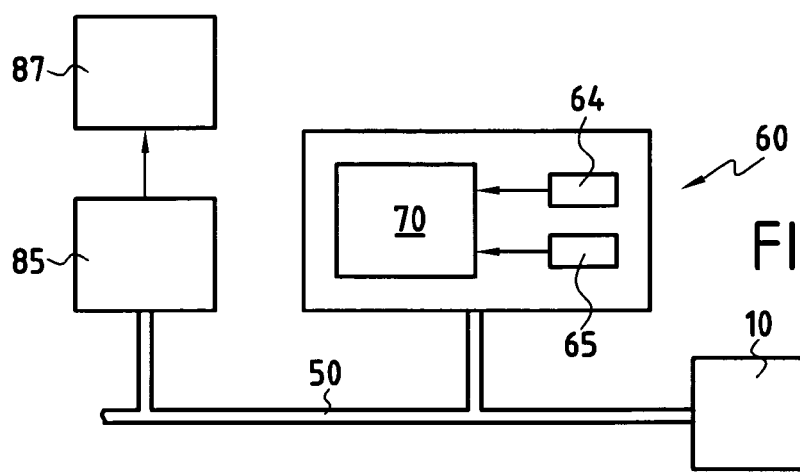
FIG. 9 shows one example of the management in accordance with the invention of an event coming from an internal clock register.
Figure 10:
FIG. 10 shows words stored in a table of actions conforming to the FIG. 9 example.

FIGS. 9 and 10 show one example of the management of an event coming from an internal clock register.

FIG. 9 shows very diagrammatically a computer system of the invention comprising a central unit 10 connected via a data bus 50 to a management module 60 and a digital interface unit 85, for example a 1553 type card, that is digitally connected to an external equipment 87. Moreover, the management module 60 further comprises two clock registers 64 and 65 numbered "0" and "1". Of course, the number of clock registers is not limited to two.

Initially, via the data bus 50, the central unit 10 initializes the clock registers 64 and 65 ("0" and "1") to 100 milliseconds, starts the management unit 70 of the management module 60, and initializes the digital interface unit 85.

When the clock register 64 numbered "0" arrives at the end of its count, it generates an event "E0" that first stops the register "0" and then starts a second clock register 65 numbered "1". The management unit 70 then writes data "55", for example, into the digital interface unit 85 via the data bus 50, which causes data to be sent to the external equipment 87.

The process described above may be coded in the manner illustrated by the table of actions represented in FIG. 10.

The first line indicates that on receiving the input vector 611 "E0=11100000" the action 612 "010" stops the clock register 64 numbered "0".

The second line indicates that the action 612 "011" starts the clock register 65 numbered "1".

On the third line, the action 612 "000", indicating a write operation via the data bus 50, is executed by writing the output vector 612 "55" with a complement 614 "00000" at the address contained in the register "address 1" of the digital interface unit 85 indicated by the output signal 615 "0000".

The next line containing the input vector 611 "FF=11111111" indicates to the management unit 70 that there are no further actions to be executed for the input vector 611 "E0".

Figure 11:
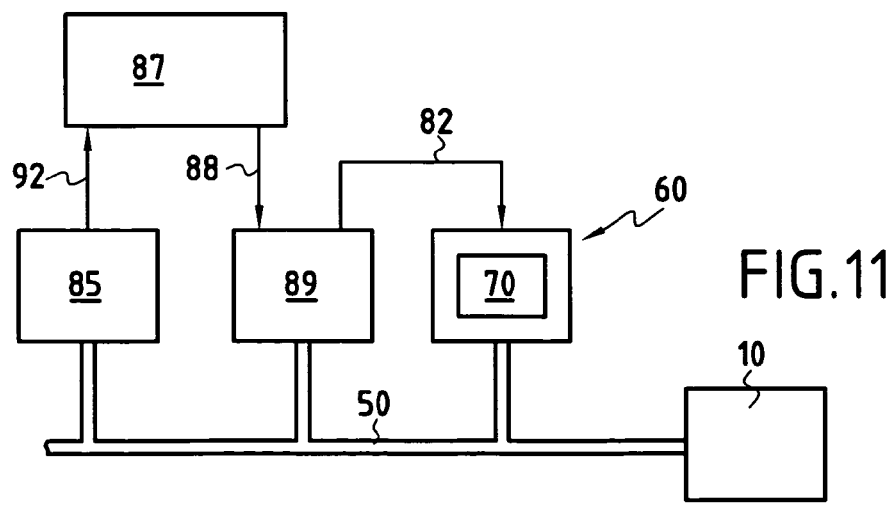
FIG. 11 shows one example of the management in accordance with the invention of an external event.
Figure 12:
FIG. 12 shows words stored in a table of actions conforming to the FIG. 11 example.
Figure 13:
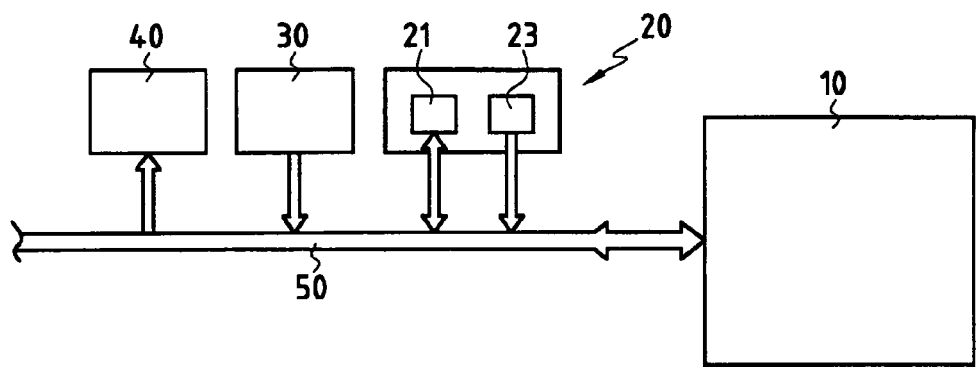
FIG. 13 is a very diagrammatic representation of a standard prior art computer system.

FIGS. 11 and 12 show one example of the management of an external event. This example relates to monitoring a certain predetermined threshold voltage of an external equipment.

FIG. 11 shows very diagrammatically a computer module of the invention comprising a central unit 10, a management system 60, an analogue acquisition unit 89 and a digital interface unit 85, for example a 1553 type card. These units are interconnected via the data bus 50. The analogue acquisition unit 89 and the digital interface unit 85 communicate with an external equipment 87. The analogue acquisition unit 89 monitors the voltage of the external equipment 87, whose only connection to the management module 60 is a digital connection via the digital interface unit 85.

The central unit 10 starts the management unit 70 of the management module 60, requests the digital interface unit 85 to send a start of generation message to the equipment 87, and finally requests the analogue acquisition unit 89 to commence monitoring the voltage of the external equipment 87 (arrow 88). From this time onwards, the central unit 10 is no longer involved in event management.

If the voltage of the equipment 87 exceeds the set threshold, the analogue acquisition unit 89 generates a triggering signal and an associated vector, for example the vector "11", which is sent to the management unit 70 (arrow 82). In turn, the management unit 70 scans the table of actions and writes data into the digital interface unit 85, for example the data "22". Following receipt of the vector "22", the digital interface unit 85 sends a command to the external equipment 87 to stabilize the voltage (arrow 92).

The process described above may be coded in the manner illustrated by the table of actions represented in FIG. 12.

On receiving the event with the input vector 611 "11", the action 612 "000", indicating a write operation via the data bus 50, is executed by writing the output vector 613 "22" with a complement 614 "00000" at the address contained in a register "address 1" of the digital interface unit 85 indicated by the output signal 615 "0000".

The next line, containing the input vector 611 "FF", indicates to the management unit 70 that there are no further actions to be executed for the input vector "E0".

The invention claimed is:

1. A method of managing events in a standard computer system comprising a central unit connected to memory units and peripheral devices by a data bus allowing a multimaster configuration, the method comprising the following steps:

receiving one or more events, time-stamping each received event, storing each received event in a first memory and a second memory, assigning at least one appropriate action to each received event, and executing that action in response to the received event, which method is characterized in that the above-mentioned management steps are carried out in real time without access to the central unit by a management unit included in an independent management module connected to the data bus and incorporated into the standard computer system, and the first memory and the second memory are associated with the management unit, the first memory storing events to be processed by the independent management module and the second memory storing events so that these events may be read via the data bus;

wherein events received by the management unit which come from outside the management module are resynchronized to a frequency corresponding to that of a clock internal to the computer system while events received from within the management module are received synchronized.

2. The management method according to claim 1, characterized in that a timescale of real-time management is of an order of one microsecond.

3. The management method according to claim 1, characterized in that the independent management module is isolated from the central unit by a bridge.

4. The management method according to claim 1, characterized in that said action is read in a table of actions associated with the management unit and is preprogrammed via the data bus.

5. The management method according to claim 1, characterized in that events received by the management unit are time-stamped to an accuracy of an order of 100 nanoseconds and stored in the second memory associated with the management unit so that these events may be read via the data bus in order to store and monitor these events.

6. The management method according to claim 1, characterized in that events received by the management unit are generated by a clock register internal to the management module.

7. The management method according to claim 1, characterized in that events received by the management unit come from a unit adjacent the management module.

8. The management method according to claim 7, characterized in that events received by the management unit are synchronized to a frequency corresponding to that of a clock internal to the computer system.

9. The management method according to claim 1, characterized in that events received by the management unit come from an equipment external to the computer system.

10. The management method according to claim 1, characterized in that events received from the external equipment are filtered to eliminate interference.

11. The management method according to claim 1, characterized in that the management unit generates an interrupt if it is not possible to associate an event with an action.

12. The management method according to claim 1, characterized in that:

a timescale of real-time management is of an order of one microsecond;

the independent management module is isolated from the central unit by a bridge; said action is read in a table of actions associated with the management unit and is preprogrammed via the data bus; events received by the management unit are time-stamped to an accuracy of an order of 100 nanoseconds and stored in the second memory associated with the management unit so that these events may be read via the data bus in order to store and monitor these events.

13. The management method according to claim 12, characterized in that events received by the management unit are generated by a clock register internal to the management module.

14. The management method according to claim 12, characterized in that events received by the management unit come from a unit adjacent the management module.

15. The management method according to claim 14, characterized in that events received by the management unit are synchronized to a frequency corresponding to that of a clock internal to the computer system.

16. The management method according to claim 12, characterized in that events received by the management unit come from an equipment external to the computer system.

17. The management method according to claim 16, characterized in that events received by the management unit are synchronized to a frequency corresponding to that of a clock internal to the computer system.

18. The management method according to claim 16, characterized in that:
events received from the external equipment are filtered to eliminate interference;
the management unit generates an interrupt if it is not possible to associate an event with an action.

19. Event management module incorporated into a standard computer system comprising a central unit connected to memory units and peripheral devices by a data bus allowing a multimaster configuration, which module is characterized in that it comprises:
an independent management unit connected to the central unit via an interface and the data bus, said management unit being adapted to receive and process events in real time without intervention by the central unit,
a time-stamping clock adapted to time-stamp these events,
a first memory associated with the management unit for storing events to be processed by the event management module,
a second memory associated with the management unit for storing the events in order to read them via the data bus; and
a random-access memory containing a preprogrammed table of actions, associated with the management unit and adapted to assign appropriate actions to events received thereby;
wherein events received by the management unit which come from outside the management module are resynchronized to a frequency corresponding to that of a clock internal to the computer system while events received from within the management module are received synchronized.

20. The event management module according to claim 19, characterized in that the data bus is a standard bus selected from the group comprising a PCI bus, a VME bus, a compact PCI bus and a USB bus.

21. The event management module according to claim 20, characterized in that:
the first memory and the second memory are of a FIFO type.

22. The event management module according to claim 19, characterized in that the first memory and the second memory are of a FIFO type.

23. The event management module according to claim 19, characterized in that the random-access memory containing the table of actions is a double-port RAM.

24. The event management module according to claim 19, characterized in that:
the first memory and the second memory are internal to the management unit.

* * * * *